United States Patent [19]

McBride

[11] 4,172,422
[45] Oct. 30, 1979

[54] TURNTABLE FOR AUTOMOBILES

[76] Inventor: Peter B. McBride, 43 Belle Vue Ave., Highton, Victoria, Australia, 3216

[21] Appl. No.: 795,466

[22] Filed: May 10, 1977

[51] Int. Cl.² .............................................. B60S 13/02
[52] U.S. Cl. ...................................... 104/44; 104/38; 134/45
[58] Field of Search ................ 187/8.41, 8.67; 340/22, 340/71; 214/16.1 A, 16.1 CA, 16.1 DC; 15/DIG. 2; 134/45; 104/35, 36, 38, 44, 46, 47

[56] References Cited

U.S. PATENT DOCUMENTS

| 1,800,722 | 4/1931 | Edson | 104/38 |
| 2,121,179 | 6/1938 | Sweetland | 340/51 |
| 2,964,144 | 12/1960 | Wheeler | 214/16.1 A |
| 3,315,763 | 4/1967 | Harvey et al. | 187/8.41 |
| 3,587,807 | 6/1971 | Hickman | 134/45 |
| 3,658,590 | 4/1972 | Huebner | 134/45 |
| 3,747,537 | 7/1973 | Matsumoto et al. | 104/88 |

Primary Examiner—Trygve M. Blix
Assistant Examiner—Ross Weaver
Attorney, Agent, or Firm—William D. Hall

[57] ABSTRACT

A turntable, for a vehicle such as an automobile, which employs several detectors arranged to determine whether an automobile is located on the turntable in a desired position. Since the desired position depends on the size of the automobile, at least three detectors are used, one for small, one for medium, and one for large automobiles. The output of the detectors is displayed by visual indication. When an automobile is detected in a proper position, the driver may energize the turntable driving motor to rotate the turntable any desired amount, for example, 180 degrees. As the turntable approaches the angular position in which it is to stop, a cam-follower signals the approach to that position, deenergizing the motor and may apply a brake. The turntable, however, coasts to its final position where a plunger is biased into a socket to lock the turntable. Upon restarting the turntable, the plunger is removed from the socket.

11 Claims, 9 Drawing Figures

TURNTABLE FOR AUTOMOBILES

BACKGROUND OF THE INVENTION

Turntables for automobiles which permit the vehicle to enter upon the turntable along a given path or roadway, and which will rotate by 180 degress so the automobile may leave the turntable going forward along that same path or roadway, are of course, well known, see U.S. Pat. No. 3,566,798, to Herbert G. Peitzman, entitled "AUTOMOBILE TURNTABLE" issued Mar. 2, 1971; and U.S. Pat. No. 2,244,598, to R. F. Ash, entitled "AUTOMOBILE TURNTABLE" issued June 3, 1941.

However, the prior art turntables have distinct disadvantages in that they have inadequate or incomplete controls. This is true notwithstanding the very long period of time which turntables for automobiles have been known.

In particular there is nothing in the prior art which insures that the automobile be properly positioned upon the turntable before the turntable can be rotated, and moreover, adequate means for stopping the turntable after it has rotated to the desired exit position are not available.

It is, therefore, an object of the invention to provide an adequate and suitable control system for a turntable.

Another object of the invention is to provide a control system for a turntable which indicates when the vehicle is properly positioned on the turntable.

Still another object of the invention is to provide a turntable which requires the automobile to be correctly positioned thereon before the turntable will rotate.

Another object of the invention is to provide adequate stopping means for the turntable.

Another object of the invention includes a provision for a low cost and efficient control system for turntables.

SUMMARY OF THE INVENTION

A turntable has two or more detectors for different sizes of automobiles such as small, medium and large automobiles. A detecting system produces an output signal when an automobile is correctly positioned on the turntable. The output signal is fed to an indicator visible to the driver. Further, the presence of such an output signal is necessary before the motor may be energized, by a push-botton available to the driver, to rotate the turntable. As the turntable approaches the position in which it is to stop, a cam-follower deenergizes the driving motor, when it engages a cam. A brake may temporarily be applied at the same time. The turntable, however, coasts to its final angular position where it is locked. The locking results from spring driven plunger entering a socket located in said cam. Before the plunger may be removed from the socket to unlock the turntable, an automobile must be correctly positioned on the turntable as indicated by said detectors. Furthermore, the driver must press the aforesaid push-button in order to (a) remove the plunger to unlock the turntable and (b) start the motor, before the turntable will again rotate.

DETAILED DESCRIPTION OF THE INVENTION

Figure 1:
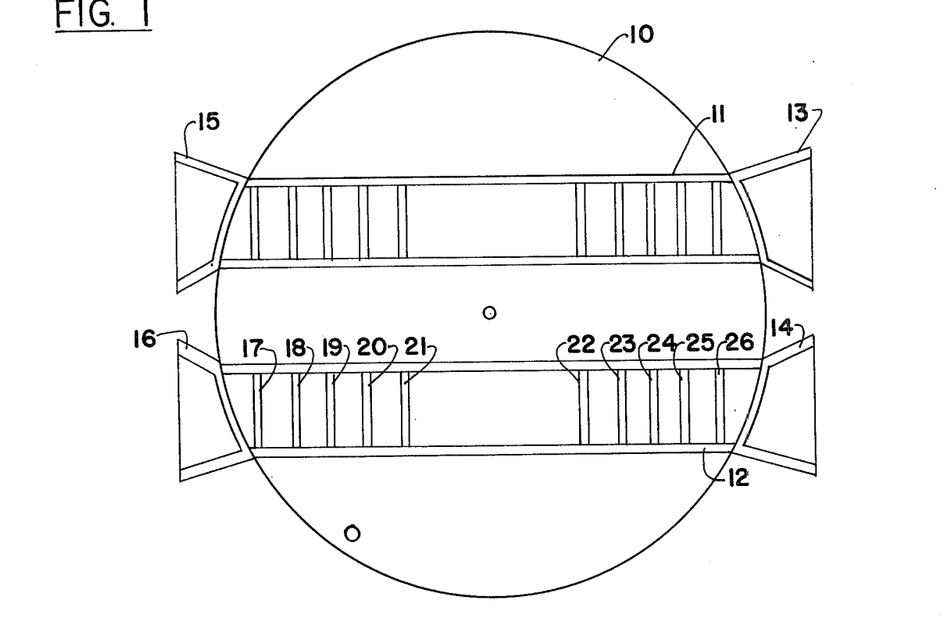
FIG. 1 is a plan view of one form of turntable embodying the invention.

In FIG. 1 a turntable 10 has two guides 11 and 12, one of which guides the righthand wheels of the vehicle and the other of which guides the lefthand wheels of the vehicle (such as an automobile). Stationary guides 13 and 14 permit a vehicle to approach from the right. Assuming, however, that the vehicle approaches from the left, the front wheels are guided by stationary guides 15 and 16 onto the guides 11 and 12. It is noted that the right front wheel passes across elastic ribs 17, 18, 19, 20, etc., until the vehicle reaches the correct position as hereinafter described. One reason why there are a series of ribs is to permit correct positioning of automobiles of different sizes. For example, there are large size automobiles, medium sizes automobiles and small size automobiles. A large automobile, with a long distance between its front and rear wheels is correctly positioned on the turntable when its right front wheel is positioned between ribs 25 and 26 and its rear wheel is positioned between ribs 17 and 18. A medium size automobile is correctly positioned on the turntable when its front right wheel is located between ribs 24 and 25 and its rear right wheel is positioned between ribs 18 and 19. A small automobile is correctly positioned on the turntable when its right front wheel is positioned between ribs 23 and 24 and its rear right wheel is positioned between ribs 19 and 20. The turntable is mounted upon a main shaft 27 which has a disc or drum brake 28 that under certain circumstances is momentarily applied to decelerate the turntable. Since, as will appear, there are a number of circuits which extend between the rotating portion of the turntable and the stationary part of the apparatus, a number of slip rings 29 are employed so that the wires from the stationary portion of the circuit may communicate to the circuit elements on the rotating portion of the machinery. A suitable gear 30 on the shaft 27 cooperates with motor drive unit 31 to rotate the turntable as required by the various controls hereinafter described.

Figure 5:
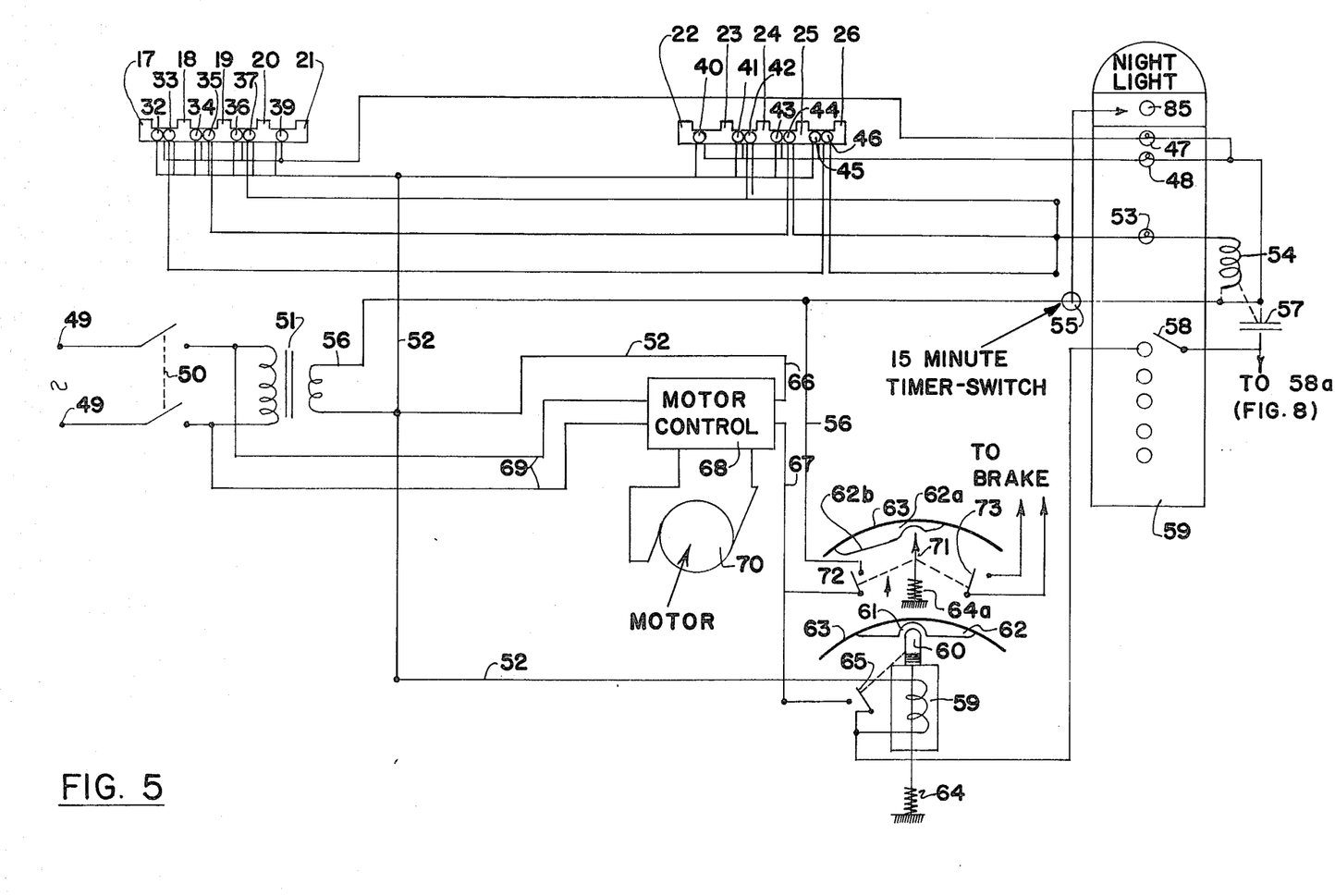
FIG. 5 is a circuit diagram showing one form of circuitry for operating the turntable.

Referring to FIG. 5, it is noted that suitable pressure-operated switches of conventional construction are located between the elastic ribs of the turntable. For example, located between ribs 17 and 18 there are pressure-operated switches 32 and 33, both of which will be operated to close the circuit therethrough when a wheel of a vehicle is positioned between ribs 17 and 18. Similarly, pressure switches 34 to 46 inclusive are located between other ribs as shown in the drawing.

Each of the pressure-operated switches 32 to 46 is a normally-open switch which is closed in response to the pressure of a vehicle wheel. Caution lights 47 and 48 are energized under conditions hereinafter described. A main power source 49, for example 115 volts, A.C., feeds power through switch 50 to the input of stepdown transformer 51. One side of the secondary of transformer 51 feeds current via wire 52 to one side of each of the pressure switches 32 to 46 inclusive.

A visual indicator, in the form of a lamp 53, is within sight of the driver of the automobile. The lamp 53 will be illuminated only if a vehicle is correctly positioned on the turntable. That is to say if a large automobile is involved, the lamp 53 will be energized only if the front right wheel of the vehicle is between ribs 25 and 26 and the rear right wheel is between ribs 17 and 18. In that case pressure-operated switches 33 and 46 will be closed, thus completing a circuit via wire 52, switch 33, switch 46, lamp 53, relay solenoid 54, timer 55 and back to the other side 56 of the secondary of transformer 51. If the large vehicle is located in any other position, lamp 53 will not be energized. However, one or more of the caution lights 47 or 48 may be energized. Similarly, when a medium sized automobile is involved, the lamp 53 will be energized only if the front right wheel of the vehicle is between ribs 24 and 25 and the right rear wheel is between ribs 18 and 19. In that case, the circuit will be via wire 52, switch 35, switch 44, lamp 53, relay coil 54, timer 55 and return wire 56. Similarly, when a small vehicle is involved, lamp 53 will be energized only if the front right wheel is between ribs 23 and 24 closing switch 42 and the rear right wheel is between ribs 19 and 20 closing switch 37. Caution light 47 is energized at any time that a vehicle wheel is located between ribs 17 and 21. Similarly, caution light 48 is energized at any time that a vehicle wheel is located between ribs 22 and 26. Suitable circuits to accomplish the energization of the caution lights as aforesaid include pressure switches 32, 34, 36, 39, 40, 41, 43, and 45. We have seen that lamp 53 is energized only when a vehicle is properly positioned on the turntable, this position depending on the size of the vehicle. Similarly, relay coil 54 is energized only under similar conditions.

Figure 2:
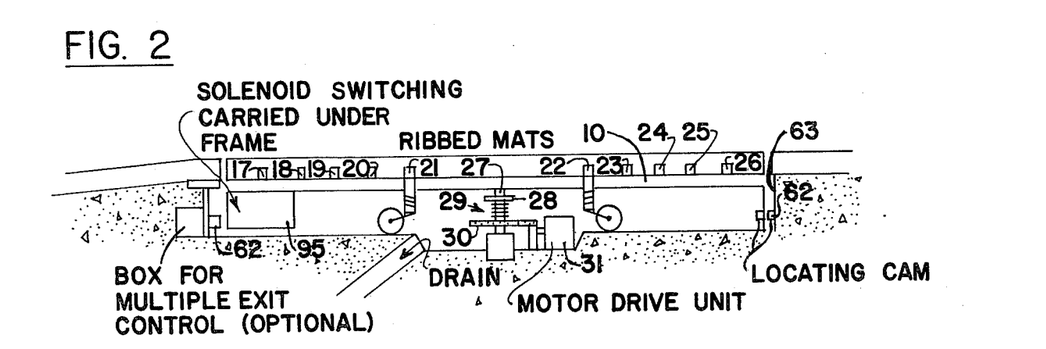
FIG. 2 is an end view of the turntable of FIG. 1.

As shown in FIG. 5 apparatus for stopping the turntable in the desired angular position is employed. In the usual case it is desired that the vehicle be driven onto the turntable, and that the turntable be constructed to rotate 180° so that the vehicle may drive away from the turntable along the same path that the vehicle employed in order to enter the turntable. To achieve this result two sockets 62 are mounted on a stationary wall 63 adjacent the turntable. These sockets 62 are positioned at opposite ends of a diameter that passes through the vertical axis about which the turntable rotates. In other words they are 180° apart, as shown in FIG. 2. Each socket 62 has an indent 61, forming a socket. Mounted on the turntable 10 and rotating with the turntable is a plunger 60. The plunger 60 is biased to move outwardly (into socket 62) by spring 64. However, when solenoid 59 is energized it will pull plunger 60 out of socket 62 notwithstanding the force of spring 64. When the plunger 60 moves out of the socket 62, switch 65 is closed. Switch 65 is open when plunger 60 is in its forward position.

There are two cams 62a mounted on wall 63. These cams are also located 180 degrees apart, and preferably the two cams 62a are respectively positioned just above the two sockets 62. A cam follower 71 is biased into contact with cam 62a by spring 64a. The cam follower 71 is carried by the turntable. When the cam follower is not in engagement with cam 62a (or is in the indent in the cam as shown in FIG. 5), switch 72 is closed, and when the cam follower is in contact with any part of cam 62a, the switch 72 is open. Switch 73 is closed only when cam follower 71 is riding on the highest part 62b of cam 62a. The shape of cam 62a of FIG. 5 is correct for the case of a turntable that rotates clockwise from its 0° position (at which a vehicle enters the turntable) to its 180° position at which the vehicle leaves the turntable. If the vehicle again reenters the turntable, its rotation in a clockwise direction may be continued by pressing button 58. Those skilled in the art can readily design a suitable shape for cam 62a if some other direction of turntable operation is desired.

The plunger 60 and cam follower 71 may be carried by control box 95 which in turn is carried by turntable 10.

When an automobile is properly positioned on the turntable so that contacts 57 are closed, it is possible for the driver to cause the turntable to rotate by a predetermined amount, usually 180 degrees. He may do this by pressing manual push-button 58 which is available to him on the post 59 that is preferably located next to the front left window of the vehicle. When contacts 57 and switch 58 are closed, current will flow through solenoid 59 via the circuit 56-55-57-58-59-52. This will withdraw plunger 60 from the indent 61 in socket 62. In the particular form of circuit shown in FIG. 5, the socket 62 is mounted upon a stationary wall 63 adjacent the preiphery of the turntable, and the plunger 60 is located on the turntable. A spring 64 tends to bias plunger 60 into socket 62 and thus lock the turntable in a given position. When the solenoid 59 withdraws the plunger 60 from socket 61, it also causes the normally-open switch 65 to close and thus establish a circuit to the control-inputs 66, 67 of motor control 68 as follows: wire 56, timer 55, contacts 57, switch 58, switch 65, input 67, input 66, and wire 52.

The motor control 68 thereupon establishes a circuit from power input 69 to motor 70, starting the motor. Assuming that the driver holds switch 58 closed for a few seconds (or assuming that a timer is employed which holds switch 57 closed for a few seconds whenever it is manually closed), the motor will rotate the turntable such an amount that cam-follower 71 will move clockwise to a position in which it no longer touches cam 62a so it will be biased toward the stationary element 63 causing normally-open switch 72 to close. This maintains the circuit to the input 66–67 of motor control 68 via the following electrical path: wires 56, switch 72, inputs 67–66, wire 52. Therefore, the motor continues to run until the cam-follower 71 engages the cam surface of the second cam (identical to the one shown in FIG. 5 but 180 degrees away from it). At that time the engagement of cam 62a by cam-follower 71 opens circuit 72 and deenergizes the motor control 68 which in turn deenergizes the motor 70. Soon thereafter, switch 73 is closed and feeds current to the brake circuit to apply the brake 28 (FIG. 2) for a brief moment, for example, one second, to decelerate the turntable. As the turntable moves slowly into its final position, the spring 64 presses the plunger 60 into the indent 61 of cam 62a thus locking the turntable in the desired angular position, which in the usual case is 180 degrees away from the starting position.

It is noted that the turntable cannot rotate unless there is an automobile on it. The turntable is held in its desired position by the plunger 60, in socket 62, and the only way that the turntable can be moved to another position is to not only have a vehicle on the turntable but the vehicle must be correctly positioned. The vehicle is correctly positioned only when the conditions described above have been met, namely, that in the case of a large automobile, two detectors 33 and 46 are closed; in the case of a medium sized automobile, the detectors 44 and 35 are closed; and in the case of a small automobile, the detectors 42 and 37 are closed. This prevents children from playing with the turntable when there is no automobile on it, and it also prevents the turntable from being rotated when the automobile is improperly positioned on the turntable.

It is desirable for the vehicle to be correctly positioned on the turntable for several reasons. First, and most important, the forces applied to the turntable are substantially reduced, during stopping of the turntable rotation, when the vehicle is correctly positioned on the turntable. Secondly, the driver is assured that the automobile is not so incorrectly positioned on the turntable that some part of the automobile is overhanging the turntable and, therefore, apt to strike an object positioned near the periphery of the turntable.

The timer 55 may be set for an interval of ten to fifteen minutes. The timer is of a type that it is turned on to close the circuit therethrough when it is "reset" and it remains "on" (circuit therethrough is closed) for the interval for which it is set whereupon it breaks the circuit therethrough. The timer may be reset by depressing manual reset button 85, so that current may again flow through it.

When the timer operates for its preset inteveral, it deenergizes the lights 47, 48 and 53 and prevents the turntables from being started until the timer is reset. To indicate the position of post 59, a neon bulb, shown as a "night light" at the top of the post, may be on continuously.

When the turntable is adapted to turn 180° at a time it may operate in two ways. First it may rotate 180° and stop, and when push-button 58 is again depressed, the turntable will continue to rotate in the same angular direction for another 180° to thereby return to its original position. Secondly, after rotating the first 180° the turntable may reverse its angular direction and return to its original position. In order to accomplish this second mode of operation, any known means for reversing the electric motor, or the gear connections involving the motor drive unit 31 and/or gear 30, may be employed at the end of each 180° of travel of the turntable.

The brake 28 is operated by an electromagnet controlled by switch 73. As the turntable rotates clockwise and cam-follower 71 approaches cam 62a, the brake 28 is off. However, when cam-follower rides up to high point 62b on the cam 62a, the switch 73 closes and stays closed momentarily until cam-follower 71 arrives at the indent in cam 62a. The brake will then be turned off and will remain off until the turntable rotates so far that cam follower 71 engages the other one of the two cams 62a. The brake may be either a disc brake or a drum brake, located on turntable shaft or motor drive shaft, and, if desired, may have progressive action. That is, it may be so designed that when the brake is first applied, it delivers maximum braking action. The braking action thereafter progressively tapers off until the brake is turned off.

In the embodiment of FIGS. 1 and 2, the cam follower 71, plunger 60, switches 65, 72 and 73, solenoid 59, and springs 64 and 64a are carried in switch box 95 carried on the underside of turntable 10.

The timer 55 may be an electromechanical timer and reset button 85 may have a lock associated with it so that the mechanism can only be operated by one who has a key capable of unlocking the lock.

Figure 3:
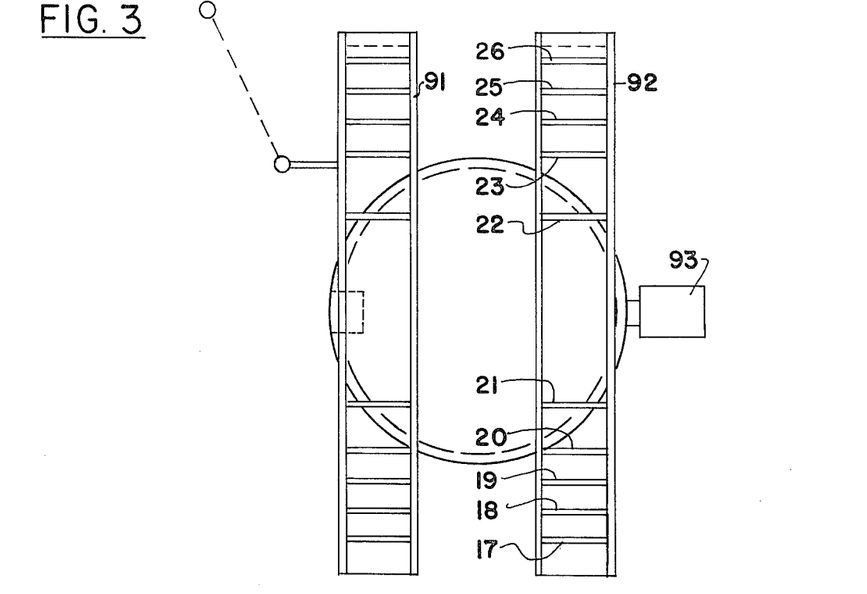
FIG. 3 is a top view of another form of turntable embodying the invention.
Figure 4:
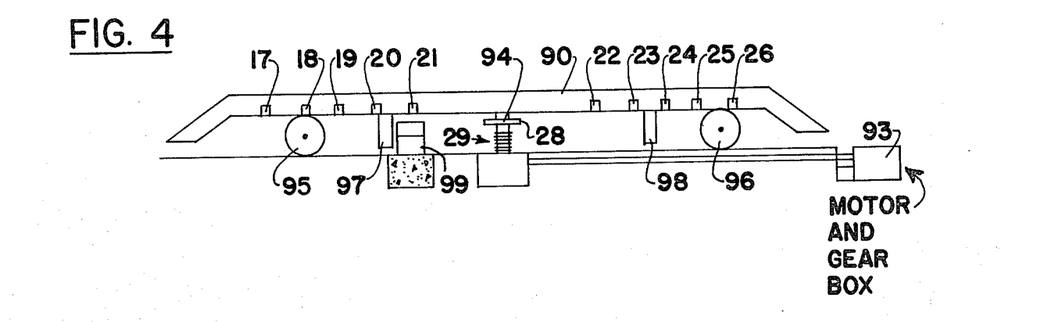
FIG. 4 is an end view of the turntable of FIG. 3.

The modified form of turntable shown in FIGS. 3 and 4 employs the circuitry of FIG. 5 and differs from the construction of FIG. 1 mainly in that the turntable is above ground level rather than at ground level. The turntable 90 has tracks 91 and 92 on which appears ribs 17 to 26, the same as in FIG. 1. The turntable is rotated by the motor and gear box 93. The turntable is supported by main shaft 94 and has disc brake 28 to stop the rotation when desired. Slip rings 29 perform the same function as they do in FIG. 2. In order to further support the turntable, casters 95 and 96 may be employed. As described in connection with FIG. 5, there should be two cams 62a mounted 180 angular degrees apart with reference to the center of the turntable. They may be mounted on a stationary wall such as 63 in FIG. 2 or they may be mounted on a projection from the turntable such as 97 and 98. In the latter case, the cam-followers 71 and the plunger 60 are mounted on the stationary support 99. Otherwise the construction and mode of operation of FIGS. 3 and 4 are the same as that of FIGS. 1 and 2.

Figures 6, 7:
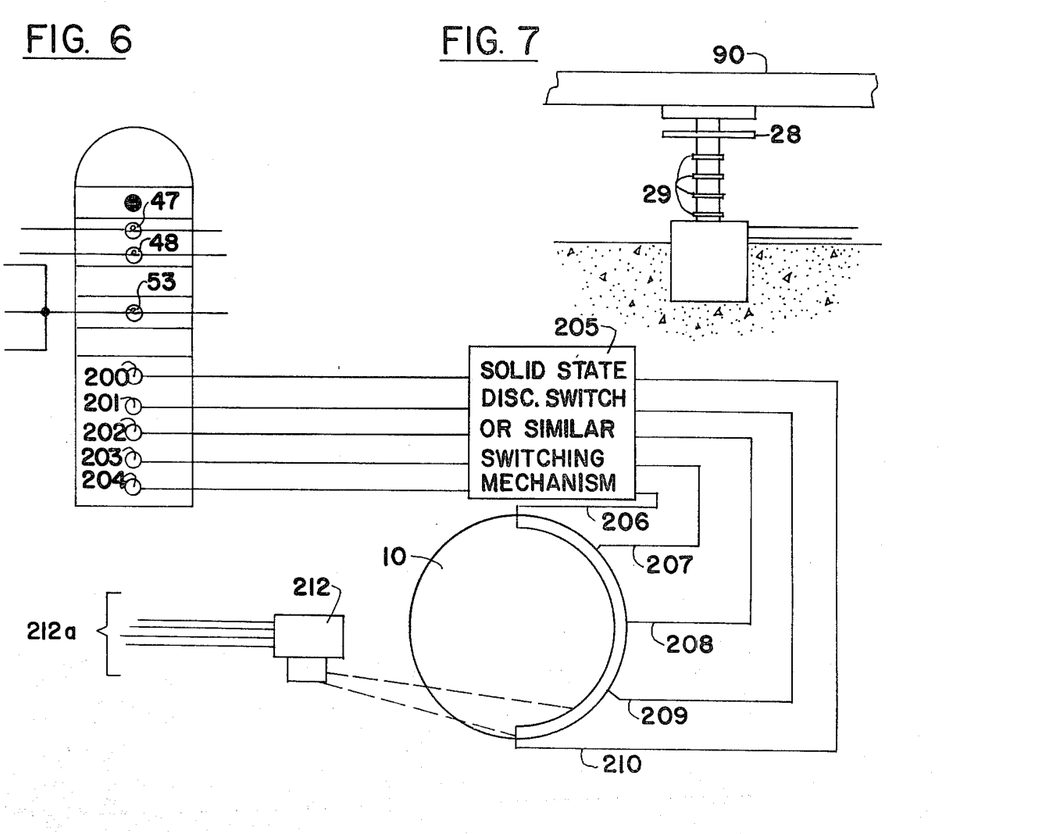
FIG. 6 is a partial circuit diagram showing another apparatus for controlling the turntable.
FIG. 7 is a detailed view of the mounting shaft, brake and slip rings used in connection with the turntable of FIG. 4.

FIG. 6 is a modified form of the invention in which the turntable may be stopped at any multiple positions. The turntable, including the ribs, pressure switches, and connection from the pressure switches to the caution lights 47 and 48 as well as the indicating light 53, remain the same as in connection with FIG. 5. However, instead of the motor control system of FIG. 5 which stops at only two positions 180° apart, there is substituted five push-buttons 200, 201, 202, 203, and 204 which control the solid state switching mechanism 205 which through its output wires 206, 207, 208, 209, and 210 control the turntable 10 to stop at any five desired positions. The turntable may be driven by motor driving mechanism 212. The motor driving mechanism 212 has four input wires 212a so that it may be reversed upon command of solid state switching mechanism 205 when desired.

FIG. 7 is an enlarged view of some of the details of FIGS. 3 and 4.

Figure 8:
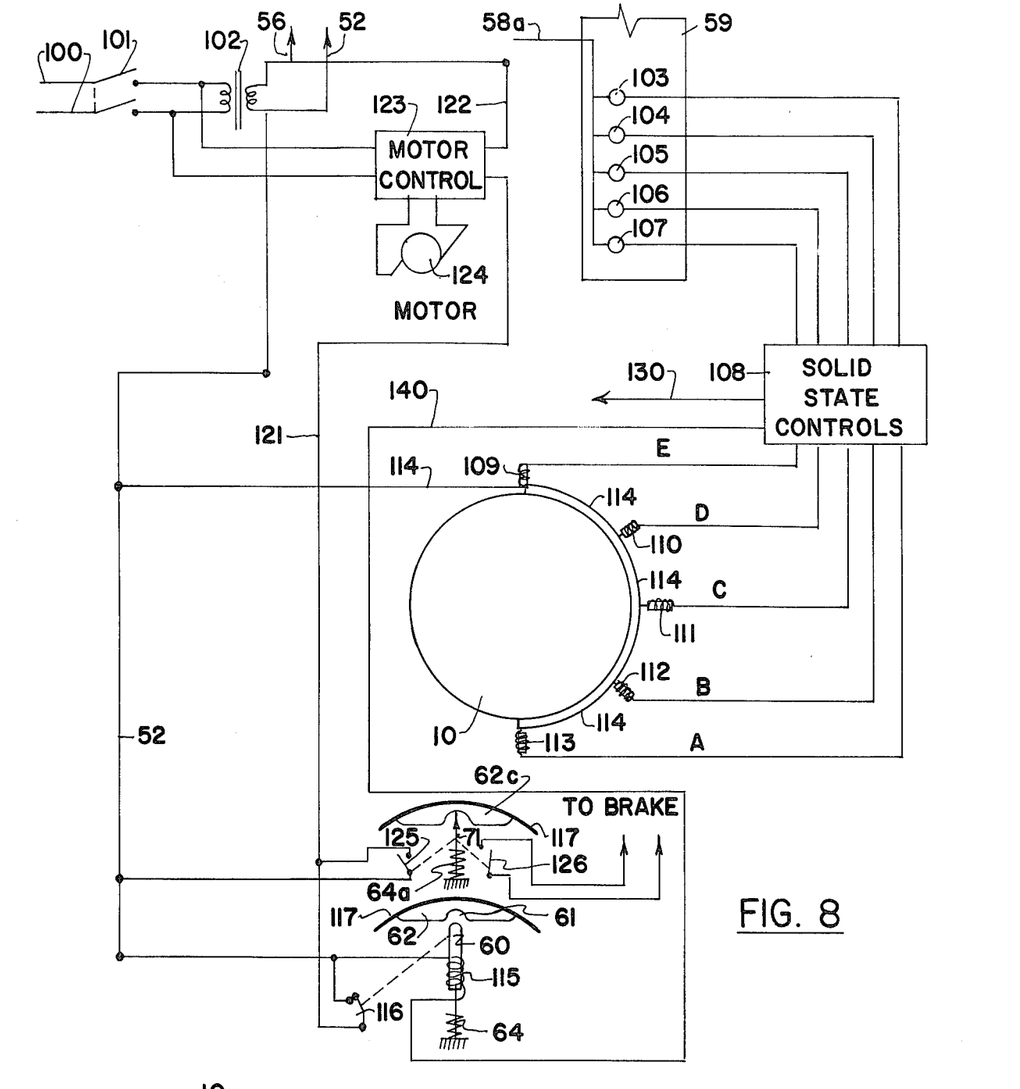
FIG. 8 is a schematic diagram of another form of the invention.
Figure 9:
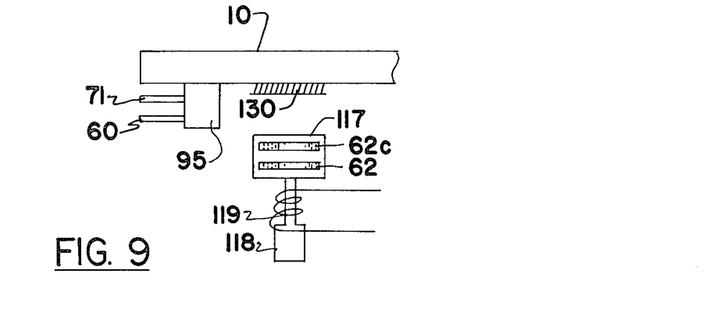
FIG. 9 is a front view of certain details of the turntable arrangement of FIG. 8.

FIGS. 8 and 9 illustrate a multi-exit turntable. Associated with turntable 10 there are solenoids 109, 110, 111, 112, and 113 positioned at the several points on the stationary support adjacent the turntable 10 where a vehicle may wish to exit from the turntable 10. In FIG. 9, solenoid 119 represents any one of the solenoids 109 to 113 and FIG. 9 shows the apparatus which cooperates with each one of the solenoids 109 to 113 inclusive. Thus, for each one of solenoids 109 to 113 there is an armature or core 118 which is attracted by the particular solenoid 109 to 113 involved (and represented by reference number 119). When solenoid 119 is energized it moves core 118 upwardly and raises support 117 upwardly until it strikes stop 130. In this position, cam 62c, which is carried by support 117 is the same horizontal plane as cam-follower 71 which is mounted in control box 95 which is in turn carried by turntable 10. Similarly when support 117 is in its raised position against support 130, the plunger 60 which is carried by control box 95 which is in turn carried by the turntable 10, is in the same horizontal plane as the socket 62 on support 117.

Each support 117 may have vertical guides (not shown) to define its path when its complementary solenoid is energized and deenergized.

For each one of the solenoids 109, 110, 111, 112 and 113 there is a complementary support 117 which support in turn carries a socket 62 and a cam 62c. Each such support 117 is in the same vertical plane as its complementary solenoid 109 to 113. When any given solenoid 109 to 113 raises its complementary support 117 to operating position, that support is operative to automatically stop the turntable 10 at a desired angular position as will hereinafter be described. It goes without saying that each support 117 and its socket 62 and cam 62c is slightly farther from the vertical axis of the turntable than the cam-follower 71 and plunger 60.

As will appear, if the turntable motor 124 is energized, the turntable will continue to rotate until the cam-follower 71 engages one of the five cams 62c. Which of the five cams 62c will be engaged depends on which one of solenoids 109 to 113 is energized to raise its complementary support 117. Once a given one of the five sockets and cams 62, 62a stops the turntable 10, the turntable 10 will remain stopped until another one of solenoids 109 to 113 is energized at which time the turntable 10 will rotate to the position of that solenoid as hereinafter explained.

In connection with the apparatus of FIG. 8, the parts bearing reference numbers 10 to 26 of FIG. 1 are a part of the embodiment of FIG. 8, the same as though shown in FIG. 8. In addition, the following parts of FIG. 5 are also similarly included in the embodiment of FIG. 8: ribs 17 to 26, inclusive, pressure switches 32 to 46 inclusive, caution lights 47 and 48, low voltage power wires 52 and 56, lamp 53, relay 54–57, push-button 58, and output wire 58a. The low voltage wires 52, 56 are fed by the output of transformer 102 of FIG. 8, and supply power to the parts 32 to 48, 53, 54, 55, 57 and 58a, which are, as stated above, employed in the embodiment of FIG. 8.

Whenever a vehicle is correctly positioned on the turntable, and the circuit through the timer 55 is closed, a signal appears on wire 58a which feeds potential to one side of each of push-buttons 103, 104, 105, 106 and 107. The presence of a signal on wire 58a permits any one of the switches 103 to 107 to be operated to rotate the turntable to the desired angular position. In the absence of a signal on wire 58a, depressing the push-buttons 103 to 107 is ineffective. When one of the push-buttons 103 to 107 has been depressed, during the period of time that a signal appears on wire 58, the corresponding one of solenoids 109 to 113 is energized. The current passing through the solenoid (109 to 113) continues through wire 114 and back to the power input 52. At the same time control box 108 supplies current for a short period (about equal to the time required for the turntable to rotate 10 to 15 degrees) to wire 140. This energizes solenoid 115 retracting plunger 60 from indent 61. The movement of plunger 60 closes switch 116 to complete the circuit through wires 121 and 122, including motor control 123. The motor 124 is thereupon started, and the turntable 10 rotates, for example clockwise, until it reaches a selected one of several units 117. The particular unit 117 selected depends on which one of push-buttons 103 to 107 was depressed, as will be explained hereinafter. When the plunger 60 arrives at the selected support 117, it enters socket 62 at which time the turntable is stopped. As the turntable approaches the position in which it is to stop, the cam-follower 71 engages the appropriate cam 62c, and as the cam-follower 71 moves across the forepart of the cam 62c, it opens switch 125 to stop the motor and momentarily closes switch 126 to apply the brake 28. As described above, the brake 28 may be of a progressive type. That is, it is turned completely on to provide maximum braking when the turntable is rotating at full speed. Therefore, as soon as cam-follower 71 engages the cam 62c, a maximum braking action occurs, and the turntable 10 begins to decelerate rapidly. However, as the turntable 10 decelerates, the braking action becomes less and less until finally, as the turntable is about to stop, the braking action ceases entirely.

The next time the turntable 10 is started, the cam-follower 71 moves out of the indent in cam 62c and would, therefore, close switch 126. But at this point the turntable 10 is going at such a slow speed that the progressive brake 28 will not apply substantial, if any, braking action. By the time that the cam-follower 71 clears the cam 62c, the turntable 10 may have sufficient speed that the brake 28 might be functional, except for the fact that the brake is, of course, deenergized as soon as the cam-follower 71 leaves the surface of the cam 62c. Consequently, the brake 28 does not at any time impair the starting of the turntable 10.

We will next describe the overall mode of operation of the device of FIGS. 8 and 9. Assuming that solenoid 109 was the last one of the solenoids 109 to 113 to be operated the turntable will be in a position wherein cam-follower 71 and plunger 60 are in the same vertical plane as the solenoid 109. If we next assume that the vehicle is properly positioned on the turntable, and that the driver presses button 105, the first thing that will happen is that the solid state control mechanism 108 will energize solenoid 111, raising its complementary support 117 to operating position. At the same time the current will pass through wire 140 to solenoid 115 withdrawing plunger 60 from socket 62. This will close switch 116 and thus energize motor control 123 which will in turn energize the motor 124. As a result, the turntable 10 will begin to rotate, for example, clockwise. When the cam-follower 71 passes beyond cam 62c, switch 125 will close and will maintain the motor 124 running. The solid state control element 108 will maintain current flow through solenoid 111 for a sufficient period to enable the turntable to rotate 90 degrees and stop. (The rotation will be 90° in the case just assumed since solenoid 109 had been energized to rotate the turntable and stop it there. Then solenoid 111 will be energized to rotate the turntable to that point. Solenoids 109 and 111 are 90° apart.) However, the solid state control 108 will energize wire 140 only for a sufficient time, following the pressing of push-button 105, to allow the turntable to rotate by a small angle, for example 10 or 15 degrees. Therefore, after a short angular rotation, the plunger 60 is pressed outwardly by spring 64, there being no current through coil 115, and switch 116 is opened. The motor, however, continues to run, since switch 125 is closed. However, since the support 117, which is complementary to solenoid 111, has been raised to operating position, the switch 125 will be opened and the switch 126 closed as soon as the cam-follower 71 engages the cam 62c which is complementary to solenoid 111. The result is that the motor 124 will be deenergized and the brake applied when cam-follower 71 arrives at a cam 62c. When the plunger 60 is in alignment with indent 61 which is complementary to and in alignment with solenoid 111, the plunger 60 will enter indent 61 and stop the turntable after a 90-degree rotation as desired. Depending upon the sophistication of the controls 108, the turntable may rotate in either one, or two, angular directions as explained below. With a simple solid state control 108, the turntable will always rotate in a clockwise direction and, therefore, if button 103 were next to be pushed, the turntable would operate in the same manner previously described to proceed clockwise from the position where cam-follower 71 and plunger 60 were in alignment with solenoid 111 to the position where they were in alignment with solenoid 109. However, since a sophisticated solid state control 108 is capable of remembering the position of the turntable 10, it may place a signal on wire 130 whenever the direction of rotation of the turntable is to be reversed in order to most quickly move the turntable 10 to its desired angular position. A signal on wire 130 may either operate to reverse the direction of the motor 124 or it may perform a reversing action in the gear train between the motor and the turntable.

It follows that with the apparatus of FIGS. 8 and 9, the turntable may be stopped at any one of several angular positions, depending on the specific design details which are employed.

When upon instructions from the operator, through depressing of push buttons 103, 104, 105, 106 or 107 and the resultant operation of solid state controls, the turntable 10 of FIG. 8 moves from one exit to another, the support 117 at the said one exit drops to the position shown in FIG. 9 due to gravity (or a spring if such is provided).

While I have referred to solid state controls 108 and 205, it is understood that the functions of these control devices can be performed by pre-solid state control devices such as systems employing electromechanical relays, etc.

In connection with all forms of the invention, the post 59 may be duplicated adjacent both runways 11 and 12 (FIG. 1) or 91 and 92 of FIG. 3 so that the operator will not be required to get out of the car to operate the controls irrespective of the position of the car on the turntable.

Moreover, in connection with the form of the invention shown in FIG. 2, wherein most of the controls are underground, any suitable means may be applied to provide weather protection for the parts below ground. For example, the roadway may be arranged to overlap the turntable, or the turntable arranged to overlap the roadway, so that there will be no space between them through which water may enter, and a suitable drainage system may be utilized.

The various controls of the above machine may operate at low voltage, for example, eight to twelve volts, whereas the motor would operate at full house-hold line voltage.

I claim to have invented:

1. A turntable for a vehicle of a type which is operated by a driver who determines the forward progress of the vehicle, comprising,
   a turntable having a vertical axis, said turntable being mounted for rotation about said vertical axis and adapted to receive said vehicle,
   detecting means responsive to a vehicle in a desired location on said turntable,
   indicating means responsive to said detecting means for giving an indication to said driver when a vehicle is in a desired location on said turntable, so that the driver may stop the vehicle in response to said indication,
   motor driven means for rotating said turntable about said axis,
   control means under control of said driver for controlling said motor to rotate the turntable about its axis including means responsive to said detecting means for preventing the starting of said motor in the absence of a vehicle in a desired location on said turntable,
   said control means including turntable-stopping means for stopping the turntable after a predetermined angular rotation thereof about said axis,
   said turntable being for a vehicle of a type having front wheels and rear wheels, in which said detecting means include first and second detectors located along the path that a wheel of a relatively long vehicle would take as it moves into a desired location on the turntable, said first and second detectors being located in the respective positions that a front wheel and a rear wheel of said relatively long vehicle would assume when such vehicle is in a desired location on the turntable,
   said detecting means including third and fourth detectors respectively located in the positions that a front wheel and a rear wheel of a relatively short vehicle would take if that vehicle were driven to its desired location on the turntable along said path,
   each said detector including means to indicate the presence of a vehicle wheel,
   said detecting means including means for producing an output signal when said relatively long vehicle is on the turntable when and only when the first and second detectors simultaneously indicate the presence of a vehicle wheel and for producing an output signal when said relatively short vehicle is on the turntable when and only when said third and fourth detectors simultaneously indicate the presence of a vehicle wheel,
   said indicating means including means responsive to said output signal for giving a visual indication that a vehicle is in a desired location, and
   said control means being operable, in response to said output signal, to start said motor-driven means to thereby rotate the turntable about its axis.

2. A turntable for a vehicle of a type having front wheels and rear wheels, as defined in claim 1 comprising:
   stationary means adjacent the turntable,
   said turntable-stopping means including first and second cooperating elements, one of said elements being carried by said turntable and the other element being mounted on said stationary means,
   one of said elements comprising cam means including a socket,
   the other of said elements comprising means engaging said socket, and a cam follower which engages said cam means as the turntable approaches the end of said predetermined angular rotation,
   said turntable-stopping means including switch means controlled by said cam follower for deenergizing said motor driven means in response to the operation of said cam follower by said cam means.

3. A turntable for a vehicle, of the type having front wheels and rear wheels, comprising:
   a turntable having a vertical axis, said turntable being mounted for rotation about said axis and adapted to receive a vehicle, and
   detecting means responsive to the position on the turntable of a front wheel, as well as of a rear wheel, of the vehicle, to determine if the vehicle is in a desired position on the turntable, said detecting means including means for determining that a vehicle with a relatively long distance between the front and rear wheels is in a desired position on the turntable only if it has wheels in first and second positions on the turntable and for determining that a vehicle with a relatively short distance between its front and rear wheels is in a desired position on the turntable if it has wheels in third and fourth positions on the turntable which third and fourth positions are closer to said axis than said first and second positions.

4. A turntable for a vehicle of the type having front wheels and rear wheels, as defined in claim 3, comprising:
indicating means responsive to said detecting means for giving an indication capable of being detected by the driver of the vehicle when the detecting means determines that a vehicle is in a desired position on the turntable.

5. A turntable for a vehicle of the type having front wheels and rear wheels, as defined in claim 3, comprising:
motor means for rotating the turntable, and
control means operable, when said detecting means determines that the vehicle is in a desired position on the turntable, to energize said motor means to rotate the turntable.

6. A turntable for a vehicle of the type having front wheels and rear wheels, as defined in claim 5, comprising:
stationary means adjacent said turntable,
first and second cooperating elements one of which is mounted on the turntable and one of which is mounted on said stationary means, and
means operated by said elements for deenergizing said motor when the turntable is approaching a predetermined angular position while rotating in one angular direction, and for locking the turntable in said predetermined angular position when it reaches that angular position.

7. A turntable for a vehicle of the type having front wheels and rear wheels, as defined in claim 6, in which said control means includes means that unlocks the turntable, at about the same time that it energizes said motor, when the control means is operated to start the motor.

8. A turntable for a vehicle, of the type having front wheels and rear wheels, comprising:
a turntable having a vertical axis, said turntable being mounted for rotation about said axis and adapted to receive a vehicle,
detecting means responsive to the position on the turntable of a front wheel, as well as of a rear wheel, of the vehicle, to determine if the vehicle is in a desired position on the turntable,
said detecting means comprising first and second detectors on said turntable,
said first and second detectors being in the path of a vehicle positioning itself on the turntable and being spaced apart a distance to conform to the spacing between a front wheel and a rear wheel of a vehicle of a first given type,
said detecting means also including third and fourth detectors positioned along said path between the first and second detectors,
said third and fourth detectors being spaced apart along said path a distance which conforms to the distance between a front and a rear wheel of a second type of vehicle smaller than said vehicle of said first given type,
each of said detectors being responsive to a vehicle wheel,
said detecting means including means that determines that a vehicle of said first given type is in its desired position only when said first and second detectors both indicate the presence of a vehicle wheel and that a vehicle of said second given type is in its desired position only when said third and fourth detectors both indicate the presence of a vehicle wheel.

9. A turntable for a vehicle of the type having front wheels and rear wheels, as defined in claim 8, comprising:
means for giving a caution signal when a vehicle wheel engages at least one of said detectors.

10. A turntable for a vehicle of the type having front wheels and rear wheels, as defined in claim 8, comprising:
vehicle-responsive means for giving a caution signal when a front wheel of a vehicle engages the second or fourth of said detectors.

11. In a turntable for a vehicle, means for moving said turntable relative to the ground, said turntable being adapted to receive the wheels of a vehicle along a line passing across said turntable,
characterized by:
a series of ribs transverse to said line, said ribs defining spaces between them for receiving the wheel of a vehicle,
first and second of said ribs being spaced apart from each other, to receive the front wheel of a given vehicle, and to comprise a first set of ribs,
third and fourth of said ribs being spaced apart from each other, and being spaced along said line from said first and second ribs, to receive the rear wheel of said given vehicle, when the front wheel is between said first and second ribs, and to form a second set of ribs,
said series or ribs including at least two additional ribs located between said two sets of ribs, one of said additional ribs being spaced from said first set of ribs to receive the front wheel of a vehicle of a size smaller than said given vehicle,
the other of said additional ribs being spaced from said second set of ribs to receive the rear wheel of said second-named vehicle when the front wheel is between the first-named additional rib and the first set of ribs,
a first detector for detecting a wheel in the space between the ribs forming the first set of ribs,
a second detector for detecting a wheel in the space between the ribs forming the second set of ribs,
a third detector for detecting a wheel in the space between the first additional rib and the first set of ribs,
a fourth detector for detecting a wheel in the space between the second additional rib and the second set of ribs, and
means for producing an output signal in response to either (a) simultaneous response by the first and second detectors to a vehicle wheel or (b) simultaneous response by the third and fourth detectors to a vehicle wheel.

* * * * *